UNITED STATES PATENT OFFICE.

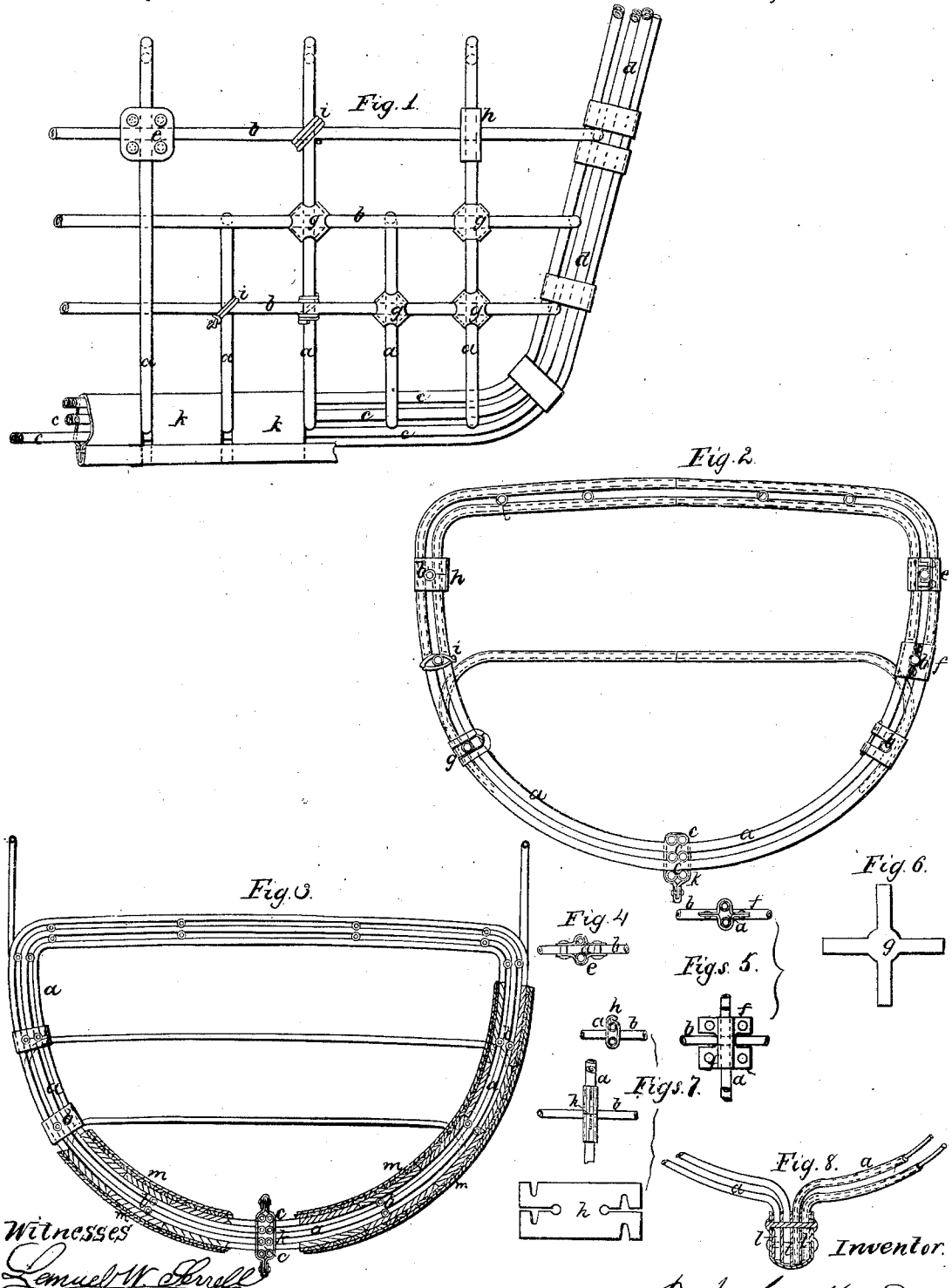

BERNARD J. LA MOTHE, OF NEW YORK, N. Y.

IMPROVED METALLIC FRAMING FOR SHIPS AND OTHER NAVIGABLE VESSELS.

Specification forming part of Letters Patent No. 37,236, dated December 23, 1862.

*To all whom it may concern:*

Be it known that I, BERNARD J. LA MOTHE, of the city, county, and State of New York, have invented, made, and applied to use a certain new and useful Improvement in Metallic Frames for Ships and Vessels; and I do hereby declare the following to be a full, clear, and exact description of my said invention, reference being had to the annexed drawings, making part of this specification, wherein—

Figure 1 is a side elevation of a portion of the frame-work for a vessel. Fig. 2 is a cross-section of the same, and Fig. 3 is a cross-section illustrative of a vessel with three decks.

Similar marks of reference apply to the same parts.

My invention consists in making the ribs and framing for ships and vessels of metallic pipes crossing each other and clamped together at the points of intersection, whereby a very light and strong framing is made, that will resist the action of the waves with the greatest tenacity by slightly yielding, and much more durable than the present character of frames.

In the drawings, $a$ $a$ are the ribs of the vessel. Each rib is composed of two or more wrought-metal pipes, bent or formed of the shape required for the cross-section of the vessel at the particular part.

$d$ $d$ are metal pipes, running lengthwise of the vessel, and horizontal, or nearly so, according to the shape of the vessel. The keel is composed of pipes $c$ $c$, running lengthwise of the vessel, and the pipes $a$ $a$, forming the ribs, pass through between them, as shown in Figs. 1, 2, and 3. The number of pipes composing the keel and keelson must vary according to the size of the vessel and the size of each pipe employed, and at $d$ the pipes $c$ $c$ rise, to form the stern or the cutwater.

The various pipes are connected to each other by suitable clamps, adapted to the particular location in the vessel. I have shown several of these fastenings for clamping the pipes together at their intersections. At $e$, Figs. 1, 2, and 4, metallic plates are shown, embracing the respective pipes $a$ and $b$ at the intersection, and held together by rivets passing through the angles. At $f f$, Figs. 2 and 5, the metal plates are shown as formed with ears or flanges riveted together, and not inclosing the pipe $b$. At $g$ $g$, Figs. 1, 2, and 6 a cross-shaped plate is shown as used to bind the pipes together at the intersections, in which case the respective metal strips occupy the angles, and the ends are clinched by folding over each other and welding or otherwise securing them in any usual manner. At $h$, Figs. 1, 2, and 7, the clasp is shown as formed of a plate to be folded around the ribs $a$, having openings to pass the pipe $b$ and notched ends to fold over and clasp into each other. The mode of folding and clinching these clamps will be apparent from the foregoing and the drawings. The various intersections might be united by rods or bars wrapped around, as at $i$ $i$, and if done in a heated state they will contract upon the pipes and hold them firmly in place. The pipes composing the keel and keelson are to be covered and bound together by the plates $k$ $k$, and these are to be united by the U-shaped exterior keel-strip, as seen in Figs. 1 and 2, or said U-shaped strip may be introduced also at the keelson, as in Fig. 3. In parts where the vessel is most adapted thereto, the keel, stem, or stern may be formed as in Fig. 8, wherein the ends of the pipes or tubes are bent off parallel to each other and secured between metallic plates $l$ $l$ by riveting or otherwise, the whole being inclosed by an exterior covering. In order to form the deck-beams, the said rib-pipes $a$ $a$ are bent off at the right places to form the "knees," and said pipes are extended across from side to side, and make the said deck-beams. In cases where lengths of pipes have to be united together, a pipe or ferrule is to be used cold, and the pipe slipped over the same in a heated state, so as to contract tightly upon the ferrule and bind the two together, and indentations may be hammered in the pipes to more firmly attach the parts together. At the places where the pipes are bent to form knees, a piece of pipe is to be introduced within the main pipe or slipped over outside of it, so as to strengthen the same. This is done previous to bending.

The planking or covering applied to my metallic frame forms no part of my invention. The same may, however, be made of planking attached to the said pipes and running in one direction, and covered with a second planking running at right angles to or in a different direction from the first, and this, again, may be covered with two or more thicknesses of metal sheathing; and a similar system of planking might be adopted in the inside of the vessel. This character of planking is illustrated at *m m*, Fig. 3. The size and proportions of the pipes must vary according to the amount of strength required at given parts, and the tubes may be either single or one inserted within another for additional strength. The tubes themselves may be of iron, steel, or any other suitable metal.

What I claim, and desire to secure by Letters Patent, is—

1. A series of metal tubes, forming the ribs of ships and other vessels, passing between the longitudinal tubes forming the keel and keelson, substantially as specified.

2. Forming the knees uniting the decks to the sides of the vessel by bending the tubes forming or extending from the deck or rib tubes, as set forth.

3. The combination of ribs, formed of pipes, with longitudinal pipes passing between each other and clamped together, substantially as set forth.

In witness whereof I have hereunto set my signature this 12th day of November, 1862.

B. J. LA MOTHE.

Witnesses:
LEMUEL W. SERRELL,
THOS. GEO. HAROLD.